Nov. 7, 1939.  A. M. GEORGIEV ET AL  2,178,686
CONDENSER VENT
Filed Oct. 17, 1936
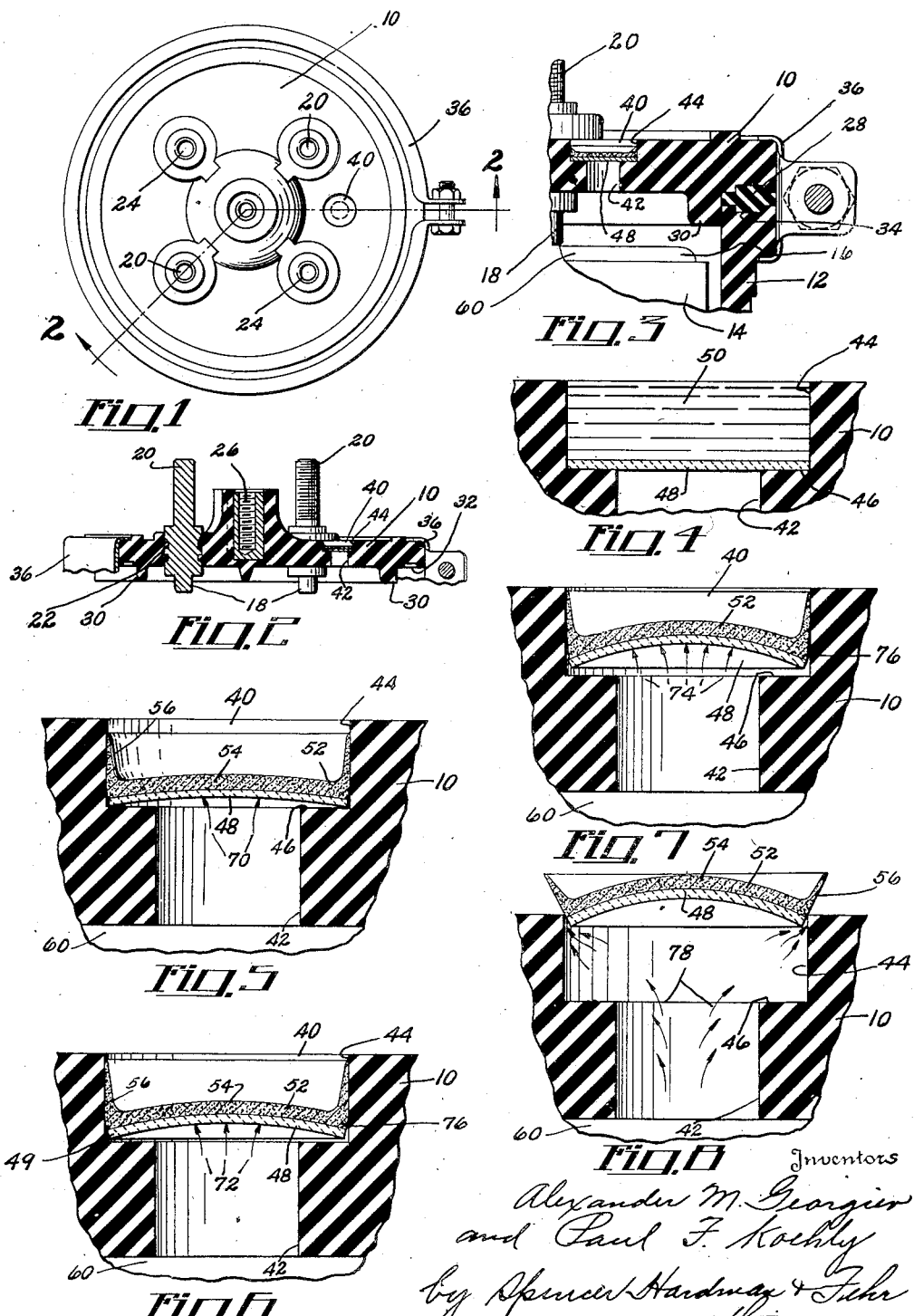
Inventors
Alexander M. Georgiev
and Paul F. Koehly
by Spencer Hardman & Fehr
their Attorneys Patented Nov. 7, 1939

2,178,686

UNITED STATES PATENT OFFICE 2,178,686

CONDENSER VENT

Alexander M. Georgiev and Paul F. Koehly, Dayton, Ohio, assignors to General Motors Corporation, Detroit, Mich., a corporation of Delaware Application October 17, 1936, Serial No. 106,098

5 Claims. (Cl. 220—89)

This invention relates to electrical condensers, and has to do with venting means for sealed containers wherein the condenser electrodes are immersed in a liquid medium, subjected to a wide range of temperature variation and pressures.

An object of this invention is to provide an improved method of venting sealed containers that are subjected to internal gas pressures under working conditions.

Another object is to provide a relievable seal for containers that will be maintained under normal conditions of operation, so as to prevent leakage of liquid content, but will operate to relieve excessive pressures before developing to the danger point.

Another object is to provide a relievable seal for electrical condensers that will eliminate all leakage of liquid, and yet yield under increased internal pressures during normal working conditions, but will be effective to relieve excessive internal pressures before the unit reaches the danger stage at which it might otherwise blow up.

Another object is to provide a method of venting sealed containers before they reach the danger stage.

These several objects are accomplished by closing an aperture through the wall of an otherwise sealed container with a yieldable membrane or stop, that is cemented in place, the stop being normally air tight, and fixed in position, but also being displaceable by pressure buildup within the container, so as to relieve excessive pressure within the container. A material is selected for the membrane that is inert as respects the liquid medium with which the container is charged, and when the membrane is in place, it and the adjacent parts of the wall member are covered with an adhesive of volatile, liquid and non-crystalline characteristics, which, upon exposure to the atmosphere soon leave a cup-like coating of air impervious material firmly adhering to the membrane and wall structure of the container with sufficient tenacity to maintain a seal for the container throughout a predetermined range of pressure changes.

Further objects and advantages of the present invention will be apparent from the following description, reference being had to the accompanying drawing wherein a preferred embodiment of the present invention is clearly shown.

In the drawing:

Fig. 1 is a top plan view of an electrical condenser involving the instant invention.

Fig. 2 is a sectional view through the cover or lid assembly of the electrical condenser, substantially as indicated by the line and arrows 2—2 of Fig. 1.

Fig. 3 is a fragmentary view of a condenser unit in section, illustrating the features of the invention on an enlarged scale of about two diameters.

Figs. 4 to 8 inclusive, are enlarged views by about 7 diameters, illustrating the method of setting the seal, and the conditions of the seal under working conditions and when relieving excessive pressure.

Specifically, Fig. 4 illustrates a step in the setting of the seal.

Fig. 5 illustrates the flexibility of the seal in responding to the normal working pressures.

Fig. 6 illustrates the conditions of the seal under extreme pressures and at the point at which the seal is nearly ready to blow off.

Fig. 7 illustrates an advanced stage of the relief feature as the seal is on its way in being blown out.

Fig. 8 illustrates that stage in which the seal has been completely released and the high internal pressure is about to be relieved.

Electrical condensers when placed in circuit and subjected to the current potential undergo considerable changes of temperature, which results in a wide range of pressures. Under such conditions, whether the condenser be of the wet type in which the electrodes are immersed in or merely impregnated with a liquid medium, or of the dry type in which the medium is a soft, solid or thick paste, or whether the medium be of some intermediate state, the occurrence of electrolysis or the chemical action, or some physical change may result in considerable pressure being built up within the container. In some cases of electrolyte-less condensers, there has been noted a condition of very high pressure which, unless relieved, is liable to cause exploding of the container, with destruction to the unit, and possible serious injury to the person. Therefore, subsequent use of the term "liquid medium" is to be interpreted to include also those mediums of electrical condensers with which the electrodes come into contact and forming the usual impregnations of the spacers, whether those mediums be truly liquid, solid or paste-like, and whether they be electrolytes or dielectrics. Should they accidentally or purposely become involved in electrolysis or other changes manifest by increased pressure, the need for a satisfactory vent will be present, and the proposed construction will provide the desired relief. However, the real need for a venting means occurs in every instance where any degree of electrolysis occurs in the completed sealed condenser. There are in the prior art vents, or reliefs as they may be called, that take into account these pressure chambers to some extent. These vents usually consist of a thin rubber membrane sealed in place, but which have been pierced so as to provide a normally closed aperture, and which upon increase of pressure will stretch or flex to permit opening of the aperture and allow the escape of the gas. Vents of this type are always attended by more or less leakage of the liquid medium through the very small aperture of the diaphragm, which leakage may result in corrosion of the parts, and possible damage to the electrodes, if the condition becomes aggravated.

With particular reference to the drawing 10 indicates the lid or cover of an electrical condenser adapted to mate up with a receptacle 12 to provide a sealed casing or container for enclosing the vital parts of the condenser. Disposed within the receptacle is a condenser body 14 made up of inter-leaved or stacked electrodes and spacers, all as is well known in the art. The condenser body, or rather the electrodes thereof are provided with connectors or straps 16 by which electrical communication is made to exposed elements 18 of terminal posts 20 secured in the lid member 10 in the preferred manner. One such method is by grooving an intermediate portion of the terminal as at 22, and then setting the members within a mold so as to cast the lid member 10 thereabout. The lid may also incorporate other inserts as 24, to be used as junction terminals, and a threaded sleeve 26 for securing a shield or other member to the lid, so as to close off a terminal compartment.

Since it is desirable to prevent leakage of the liquid contents from within the interior of the receptacle, means are provided at the contiguous portions of the lid 10 and receptacle 12, so that there will be a close fit provided, and so that a sealing ring 28 as of rubber may be inserted. In the present instance these provisions constitute a peripheral rib 30 on the under side of the lid and spaced inwardly from the edge of the lid, so as to leave a flat surface which may be grooved at 32 to form a circumferential recess. The terminating edge of the receptacle 12 is likewise grooved at 34, which, with the groove 32 of the lid receives the extruded portion of the ring 28, when the lid 10 is clamped in place, and secured or held by the clamp ring 36, all of which is shown in detail in Figs. 1 and 3.

The improved relief or venting means constitutes a stepped bore with a closure member therefore substantially as indicated at 40 in Figs. 1, 2 and 3. Referring particularly to the large scale views, the counter-bore comprises a portion of reduced diameter 42 opening to the interior of the sealed container, and joining an enlarged portion 44 by a plane-like shoulder 46, the larger portion 44 of the bore opening to the exterior of the container. The vent or relief means may be set in position either before or after the lid is secured to the receptacle, but it is preferred that this step be perfected before hand. In either instance, the venting means is set according to the following procedure. With the lid member 10 lying flat upon the bench or table, so that the enlarged aperture 44 is opening upwardly or toward the zenith, a thin disc or membrane 48 is placed in the larger portion 44 of the counter-bore so that it rests upon the shoulder 46, which results in a cup-like recess in the lid 10 formed by the side walls of the aperture 44 and the disc or membrane 48. This recess so formed is thence filled substantially level full with a cement or adhesive 50, of a thin and highly volatile nature. The disc or membrane 48 acts sufficiently as a stopper to prevent the cement 50 from leaking or running through to the smaller portion of the aperture 42. The lid 10 with the seal so set is then allowed to stand until the liquor or solvent of the cement has evaporated, which will result in a seal of the nature disclosed in Fig. 3 of the drawing where the member 48 is overlaid with a cup-like plug 52 adhering to the upper surface of the disc 48 and the side walls of the aperture 44.

While Figs. 5 to 8 inclusive illustrate various stages of the seal or venting means during its pressure relieving function, or while it is being blown out, those views are convenient to refer to for further describing the seal that is prefected. Referring to Fig. 5 in particular, and taking into account that the disc 48 is pressed flat against the shoulder 46, and is generally unflexed, as more particularly illustrated in Fig. 3, then a clear perception may be had of the relief means after it has been set, and before the internal pressure has affected it to the extent that is shown in Fig. 5. The seal will then appear substantially as shown in Fig. 3 of reduced scale. After the seal has been allowed to stand until the solvent has completely evaporated from that condition illustrated in Fig. 4, the solid matter in the cement takes the form of a deep drawn cup 52, which is illustrated in the large views 5 to 8, wherein a relatively thick covering 54 extends over the upper surface of the disc 48 and thence terminates at its edges in an upwardly extending flange 56 of tapered cross section, there being a substantially greater thickness of material at the juncture of the disc 48 and the side walls of the aperture 44 as is illustrated at 52. Due to the character of the materials that are selected for the lid 10, the disc 48 and the seal 52, there will be considerably greater adhesion between the layer 54 and the disc 48 than between the layer 56 and the material 10 forming the side walls of the aperture 44.

By taking into account the surface area of the enlarged aperture 44, the ingredients and the proportions of the cement to be deposited in the receptacle, the characteristics of the venting means can be predetermined, and a seal can be provided that will relieve internal pressures under predetermined conditions.

In a specific instance of condenser manufacture where an electrolyte of glycerin and ammonium acetate is used, a material suitable for the membrane or disc 48 is found to be a good quality of varnished paper of .007 inch thickness, it being substantially inert as respects the electrolyte specified. The cement that is found desirable, and which will give a working pressure between 25 to 35 pounds per square inch, consists of 18 parts of a Celluloid solvent, such as that now known commercially under the trade name Duco thinner, to one part of Celluloid. While Duco thinner has been specified, any other thinner or solvent for nitrocellulose material having the same or similar characteristics as to rapid evaporation is contemplated. Where it is desired to increase the working pressure to about 50 pounds per square inch these same ingredients are mixed in the proportions of about 13 to 1. Cements or adhesives of this character are of non-crystalline make-up so as to leave an air impervious coating upon evaporation of the solvent, and yet are of sufficient liquification to readily flow into the recess 34 and make contact with all of the exposed surfaces. When the thinner or solvent of the cement is allowed to vaporize the solidified material extends in a continuous integral coating over the walls of the recess 44, resulting in a cup-like plug whose bottom wall 52 firmly adheres to the disc 48 and whose side wall 56 firmly adheres to the cylindrical surface of the bore 44.

While a specific example has been set out of the materials used for the membrane and the cement that are desirable for an electrical condenser characterized by the stated liquid medium, and enclosed in a container of molded composition, applicants do not intend to limit the invention to constructions of the specified ingredients. It is contemplated that if liquid mediums or other ingredients are to be used, for instance electrolytes incorporating ethanolamine, it may be desirable to select a material for the disc 48 other than varnished paper. Also it may be desirable to use a material for the disc 48 other than a paper or equivalent material of .007 inch in thickness. Similarly, if Bakelite, metal, or vulcanized fiber be adopted for the lid 10, it may then be desirable to use some other cement and in other proportion than that hereinabove specified.

With an electrical condenser so constructed and sealed as hereinabove set forth, which is shown in Fig. 3, it will be appreciated that the condenser body 14 with its liquid medium is enclosed within the receptacle 12 and lid 10 to the extent that it is completely isolated from the effects of outside air by the yieldable venting means 40. Due to the character of the assembly, there is provided an air space 60 above the condenser body 14 and beneath the lid 10 and which extends into the smaller portion of the bore 2. This space 60 acts somewhat as an expansion chamber for the condenser unit, inasmuch as the gaseous pressure within the container varies somewhat during the life of the condenser. During normal temperatures, and while the unit is on the shelf, the pressure within the chamber 60 will be substantially equal to atmospheric pressure. But when the unit is placed in service electrical charges upon the electrodes of the condenser will result in raising the temperature of the elements within the container, which results in an increased pressure of the gas within the chamber 60. Under normal working conditions the seal of the condenser provided by the disc 48 and the cement will maintain the unit sealed as respects the outside air. In maintaining this seal the disc 48 and its cup 54 will yield somewhat as a diaphragm in responding to the increased pressure within the container, substantially as is indicated in Fig. 5. In so doing the disc 48 and the bottom wall 54 of the cup will flex or bow outwardly and upwardly to produce something like a crowning effect, while the flange portions 56 of the cup will firmly adhere to the walls of the larger aperture 44. The arrows 70 have been applied in Fig. 5 to indicate the pressure as acting upon the disc or diaphragm 48 during the normal working conditions.

When the pressure within the condenser becomes excessive, that will be manifest by greater pressure exerted upon the disc 48 and its retaining cup, as exemplified by the increased number of arrows 72 and 74 in Figs. 6 and 7. In Fig. 6 there is an attempt to illustrate the conditions of the seal at that time at which it is just breaking loose from the lid 10 due to the increased pressure. The excessive pressure beneath the disc 48 bows up or crowns the same to a greater extent than is illustrated in Fig. 5. This increased bowing or flexing of the disc 48 tends to pull in the edges 49 of the disc and retract them from the wall 44 of the enlarged bore. Since the adhesion between the bottom of the cup 52 and the disc 48 is greater than is the adhesion between the side wall 56 of the cup and side wall of the bore 44, the result is that the cup 52 is peeled away or freed from the wall of the aperture 44, substantially as is indicated at 76. As is illustrated in Fig. 6, the loosening of the cup side walls from the lid 10 has advanced sufficiently far to permit the venting assembly to start on its outward movement through the larger bore 44. In Fig. 7, it will be observed that the venting assembly is well on its way out and is about ready to blow out. In Fig. 8, an attempt has been made to illustrate the final step in relief of the pressure, and in which the venting assembly is substantially free from the lid member 10 and the pressure is being relieved as is indicated by the increased number of arrows 78.

It is to be understood that the pressure relief, or that the condition resulting and diagrammatically illustrated in Fig. 8 is practically instantaneous, rather than gradual as might be interpreted by the detail illustrations. Once the working pressure within the container increases beyond the predetermined value, or increases above that stage at which the venting assembly will respond with its yieldable function as illustrated in Fig. 6, the pressure relief function illustrated by the succeeding views in Figs. 6, 7 and 8 is comparatively sudden. Once the side walls 56 of the cup begin to free themselves or peel away from the wall 44 of the lid, the force tending to retain this venting assembly in place is diminished, resulting in the rapid outward movement of the venting assembly. Taking into account the strength of materials, the force of adhesion, the surfaces involved, and the pressures to which the parts are subjected, the venting plug assembly is so characterized as to be the weakest point of the enclosing structure. As a result, upon marked increase of pressure within the container the venting assembly will relieve the internal pressure when it becomes excessive, but before it becomes sufficiently high to result in rupture or destruction of the container.

While the embodiment of the present invention as herein disclosed, constitutes a preferred form, it is to be understood that other forms might be adopted, all coming within the scope of the claims which follow.

What is claimed is as follows:

1. In an electrolytic condenser having a sealed container, the combination of a pressure vent comprising, a wall member having a counter-bored aperture, an impervious disc seated against a shoulder of the counter-bore, and a cup of colloidal material tightly adhering to the disc and side walls of the counter-bore.

2. The method of forming a vent for a closed container, comprising the steps in combination, providing a counter-bored aperture through a wall of the container so that the larger part of the bore is accessible from the exterior thereof, placing a diaphragm member in the larger part of the bore to substantially close the aperture, filling the recess formed by the larger part of the bore and the diaphragm with a liquid colloidal adhesive, and permitting the solvent of the adhesive to evaporate leaving a coating of solid material on the exposed surfaces of the larger part of the bore and the diaphragm.

3. The method of forming a vent for a closed container, comprising the steps in combination, forming a reduced aperture opening to the interior of the container, closing off the aperture by inserting a disc of relatively thin material, and filling the recess thus formed with a highly volatile liquid adhesive.

4. In a sealed container, a vent comprising in combination, a wall member providing a stepped bore, a membrane disposed in the larger part of the bore, and a non-crystalline cement having a non-volatile constituent forming a continuous coating on the sides of the larger bore and the surface of the membrane.

5. In a sealed container, a vent comprising in combination, a wall member having an aperture therethrough ending in a counter-sink, means in the counter-sink for closing the aperture, and means sealing the aperture against free flow around the closing means, comprising a non-volatile residue effected upon evaporation of a liquid Celluloid solution, said residue forming a continuous coating on the side walls of the counter-sink and the adjacent surface of the closing means.

ALEXANDER M. GEORGIEV.
PAUL F. KOEHLY.